(12) United States Patent
Lauf et al.

(10) Patent No.: US 6,899,827 B2
(45) Date of Patent: May 31, 2005

(54) INORGANIC OPTICAL TAGGANT AND METHOD OF MAKING

(75) Inventors: Robert J. Lauf, Oak Ridge, TN (US); Kimberly K. Anderson, Knoxville, TN (US); Frederick C. Montgomery, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 12 days.

(21) Appl. No.: 10/439,608

(22) Filed: May 16, 2003

(65) Prior Publication Data

US 2005/0092408 A1 May 5, 2005

(51) Int. Cl.$^7$ .............................................. C09K 11/00
(52) U.S. Cl. ..................... 252/301.4 R; 252/301.4 S; 252/301.4 F; 252/301.4 H; 252/301.4 P; 252/301.5; 252/301.6 R; 252/301.6 S; 252/301.6 P; 252/301.6 F; 252/965; 252/645; 149/123; 501/12; 501/32; 501/33; 501/127; 501/153; 501/152; 501/103
(58) Field of Search .............................. 501/12, 32, 33, 501/127, 153, 152, 103; 252/965, 645, 301.5, 301.4 R–301.4 H, 30.6 R–30.6 F; 149/123

(56) References Cited

U.S. PATENT DOCUMENTS

| | | | |
|---|---|---|---|
| 3,709,826 A | * | 1/1973 | Pitt et al. ............... 252/301.4 P |
| 3,772,099 A | | 11/1973 | Ryan et al. |
| 3,897,284 A | | 7/1975 | Livesay |
| 3,961,106 A | | 6/1976 | Heytmeijer et al. |
| 3,967,990 A | | 7/1976 | Ryan et al. |
| 3,993,838 A | | 11/1976 | Heytmeijer et al. |
| 4,053,433 A | | 10/1977 | Lee |
| 4,131,064 A | | 12/1978 | Ryan et al. |
| 5,062,993 A | | 11/1991 | Arnold, Jr. et al. |
| 5,420,086 A | | 5/1995 | Brandau et al. |
| 5,470,503 A | * | 11/1995 | Braconnier ........... 252/301.4 P |
| 5,821,186 A | | 10/1998 | Collins |
| 2003/0078156 A1 | | 4/2003 | Lowden et al. |

* cited by examiner

Primary Examiner—C. Melissa Koslow
(74) Attorney, Agent, or Firm—Shelley L. Stafford

(57) ABSTRACT

Sintered, translucent ceramic microbeads, preferably alumina, titania, zirconia, yttria, zirconium phosphate, or yttrium aluminum garnet (YAG) are doped with one or more optically active species. The beads may be added to substances such as explosives in order to create a distinctive optical signature that identifies a manufacturer, lot number, etc. in the event of the need for forensic analysis. Because the beads have a generally spherical surface, the radius of curvature provides an additional distinguishing characteristic by which a particular sample may be identified. The beads could also be formulated into paints if needed to create distinctive optical signatures for camouflage, decoys, or other countermeasures and could also be applied as a dust to track the movement of personnel, vehicles, etc.

14 Claims, 1 Drawing Sheet

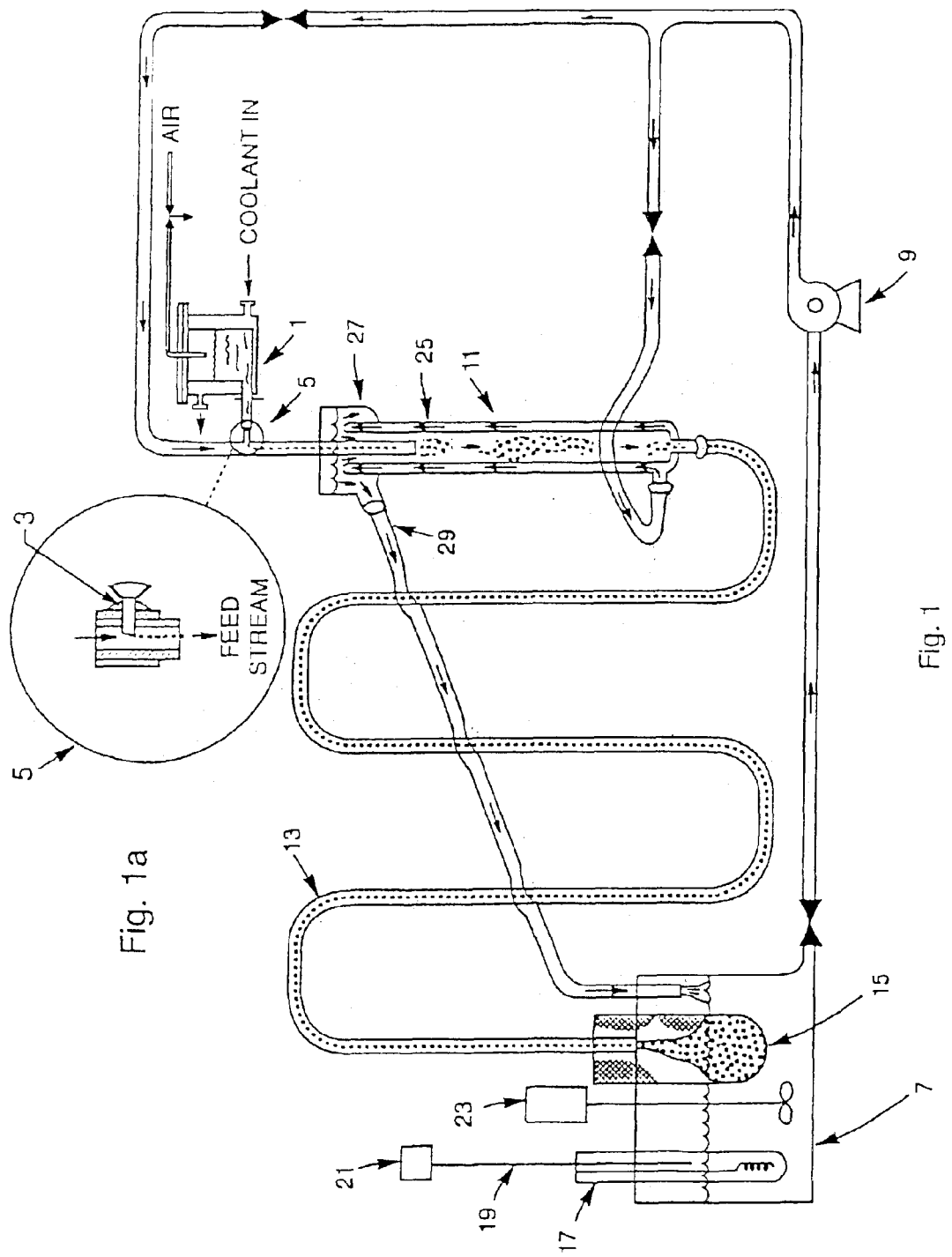

INORGANIC OPTICAL TAGGANT AND METHOD OF MAKING

This invention was made with Government support under Contract No. DE-AC05-00OR22725 awarded by the U.S. Department of Energy to UT-Battelle, LLC, and the Government has certain rights in this invention.

FIELD OF THE INVENTION

This invention relates to the field of optical taggants and more specifically, to materials and methods for tagging explosives and propellants for forensic identification, quality control, and other purposes.

BACKGROUND OF THE INVENTION

There is an ongoing desire within the law enforcement communities to have a way of recognizing or tracing explosives that have been used in a crime. It will be appreciated that a useful taggant will need to satisfy a number of challenging performance requirements. First, the taggant material must be easily and cheaply dispersed throughout a batch of explosive material using traditional formulating and blending equipment. At the same time, explosives, by their very nature, must be formulated carefully and the industry is understandably reluctant to add materials that might make them unstable or unpredictable. In particular, taggants made from small bits of plastic might be a source of static electricity that could lead to catastrophic detonation during processing, mixing, or loading cartridges. Users will also balk if the performance of the explosive is degraded or if significant costs are added. For the taggant particles to be useful, they must be easily recovered at a crime scene. This means they must first survive and then be detectable (found and collected) at the scene with simple equipment. They must also retain enough of their original distinctive properties to meet the standards of legal evidence. Among other things, this means that the taggant particles must be easily distinguished from other natural or man-made particles such as minerals, cement, fly ash, smelting residues, and the like.

Several methods for tagging sensitive materials such as explosives have been developed. These utilize colored or magnetic particles that can be recovered in the field and then "read" by recognizing some distinguishing characteristic such as the pattern of colored bands or a distinctive spectral response.

Powdered phosphor materials potentially satisfy several of the aforementioned requirements for use as taggants. They are bright (i.e. only a small amount is needed in order to be detected), each material exhibits its own unique optical characteristics that can be easily detected, and they are compatible with common bullet and propellant materials. Some of the best candidate materials are ceramics, and are thus capable of enduring harsh environments with no impact on their optical functionality.

In U.S. Pat. No. 3,772,099, dated Nov. 13, 1973 a fluorescent tagging means for pre-detonation or post-detonation identification of explosives is described. A combination of "spotting" phosphor, which is excitable by ultraviolet radiation to provide a band-type emission and "coding" phosphors, which emit a line-type emission, were added to explosives. All of the phosphors have very small particle sizes and are incorporated into phosphor grains held together by inorganic cement or a binder, and the resulting conglomerate grains are dispersed in the explosive. After an explosion, the phosphor grains can be readily located by the ultraviolet response of the spotting phosphor, and information disclosed by the presence (or absence) of the coding phosphor can then be decoded. The spotting phosphor will also normally provide some additional indicia of information. Further refinements of this tagging system are disclosed in U.S. Pat. No. 3,967,990, dated Jul. 6, 1976.

To inhibit any tendency for the phosphor conglomerate particles to sensitize the explosives, the individual particles were encapsulated in an organic plastic material such as polyethylene and a method for so encapsulating these particles are disclosed in U.S. Pat. No. 3,961,106, dated Jun. 1, 1976. These encapsulated particles can incorporate an anti-static coating, such as amorphous carbon, in order to prevent electrostatic charging thereof, and such a coating is described in U.S. Pat. No. 3,993,838, dated Nov. 23, 1976.

U.S. Pat. No. 3,897,284, dated Jul. 29, 1975, discloses microparticles for tagging of explosives, which particles incorporate a substantial proportion of magnetite that enables the particles to be located by means of magnetic pickup. Ferrite has also been used. More recently, modified tagging particles with strips of color coding material having a layer of magnetite affixed to one side and layers of fluorescent material affixed to both exterior sides, has been developed. In this system, the taggant can be located by visual detection of the luminescent response, or magnetic pickup, or both. Both the ferrite and the magnetite materials are, however, dark colored and absorptive of the radiation which excites the luminescent material, thereby making the particles somewhat difficult to locate after an explosion. Further developments produced similar particles that take advantage of the magnetic properties without diminishing the luminescent response of the materials (U.S. Pat. No. 4,131,064).

Yet, another approach is the development of particles coded with ordered sequences of distinguishable colored segments (U.S. Pat. No. 4,053,433). Other patents employ radioactive isotopes or other hazardous materials as taggants.

OBJECTS OF THE INVENTION

The present invention is intended to overcome many of the shortcomings of earlier approaches and simultaneously satisfy more of the desired performance attributes for a robust, flexible taggant system.

Accordingly, it is one object of the present invention to provide a taggant material that is inert and easily blended with explosive materials without degrading stability or explosive performance.

It is another object of the present invention to provide a taggant material that is easily detected after an explosion and displays a unique, traceable combination of physical characteristics.

It is yet another object of the present invention to provide a taggant material that has one or more characteristics that distinguish it from natural or man-made materials of similar size.

It is still yet another object of the present invention to provide a taggant material that is environmentally stable so that it may be recovered after some exposure to the elements without losing its distinctive properties.

It is a further object of the present invention to provide a method of making an inorganic material that fulfills the physical requirements for tagging explosives or other materials of interest.

It is another object of the present invention to provide a method of making an inorganic taggant material in numerous compositional and size variants so that a large number of uniquely identifiable batches may be created.

Further and other objects of the present invention will become apparent from the description contained herein.

SUMMARY OF THE INVENTION

In accordance with one aspect of the invention, the foregoing and other objects are achieved by an optical taggant material comprising sintered translucent ceramic beads wherein the beads comprise at least one optically active species in solid solution, whereby the beads have a distinctive optical spectrum. The beads further have a substantially spherical surface with a characteristic diameter greater than about 10 $\mu$m and less than about 2 mm whereby this characteristic diameter provides a further distinguishing feature.

In accordance with another aspect of the invention, other objects are achieved by a method for making an optical taggant comprising the steps of: selecting a metal oxide host material being substantially transparent in its pure form; forming a generally spherical hydrous bead of the selected metal oxide by a sol-gel process; incorporating within the bead a dopant comprising at least one optically active metal ion; drying the doped bead; and sintering the bead to form a substantially dense, translucent solid solution having an identifiable optical spectrum owing to the presence of the dopant and an identifiable surface curvature owing to the spherical shape. The bead may optionally be converted to a phosphate or other desired phase by hydrothermal treatment after gelation and prior to sintering.

BRIEF DESCRIPTION OF THE DRAWINGS

In the drawings:

FIGS. 1 and 1a illustrate an apparatus useful in an internal gelation process for making hydrous metal oxide spherules, suitable for mass producing the inventive beads in a continuous or semicontinuous manner.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is designed for the fabrication of small, ceramic microbeads containing at least one optically active dopant in a substantially inert, substantially spherical matrix. These beads can be added to substances such as explosives in order to create a distinctive optical signature that identifies a manufacturer, lot number, etc. in the event of the need for forensic analysis. The beads of the present invention can also be formulated into paints if needed to create distinctive optical signatures for camouflage, decoys, or other countermeasures and can also be applied as a dust to track the movement of personnel, vehicles, etc. These beads can be found at the scene using an ultraviolet source, and after collection, their optical spectrum, diameter, and other physical characteristics form a recognizable, defensible, "fingerprint". The beads are chemically inert and easily blended in batch processes, and are highly stable under normal environmental conditions.

The ceramic beads of the present invention comprise a selected translucent metal oxide host material formed into a substantially spherical hydrous bead of the selected metal oxide having a dopant therein. The dopant comprises at least one optically active species giving the beads a distinctive optical spectrum. The beads further have a substantially spherical surface with a characteristic diameter greater than about 10 $\mu$m and less than about 2 mm. This characteristic diameter provides a further distinguishing feature. Some preferred host materials include alumina, zirconia, zirconium phosphate or yttrium aluminum garnet (YAG), other host materials include titanium oxide, hafnium oxide, dysprosium oxide, holmium oxide, erbium oxide, thulium oxide, ytterbium oxide and lutetium oxide. All of these materials can be made into generally spherical beads by selected sol-gel processes. YAG is especially suitable for several reasons. First, YAG is a well-known and well-characterized host material for many optical dopants, particularly rare earths. Secondly, when forming YAG from the oxides, it is easily sintered to translucency because of the formation of a transient liquid phase. Thirdly, after sintering, YAG is hard and chemically very stable.

The term "optically active dopant" as used herein, defines any metal ion that is at least partially soluble in the host phase and whose presence in the host modifies the optical properties of the host in a clearly detectable way. Such modification might include the creation of characteristic absorption or emission lines or bands, as well as introduction of fluorescent lines or bands when the doped material is illuminated by UV light. The dopants may be added in any of several convenient ways. This is due partly because of the relatively low concentrations of dopants needed (typically less than 1%). For instance, in the case of a rare earth element (REE) dopant in YAG, the chosen REE can be added in the form of a salt, such as nitrate, directly into the starting broth in substitution for a like amount of the yttrium. Alternatively, the gel beads can be infiltrated with a dilute solution of the selected dopant, after gelation, but before drying and sintering. This step can also be carried out in a hydrothermal process (Parr reactor). Alternatively, the dried or calcined beads may be soaked in a dopant solution followed by another drying step, and then sintering.

One sol-gel method used to make the beads of the present invention is an internal gelation method used by Collins in U.S. Pat. No. 6,602,919, incorporated herein by reference and in U.S. Pat. No. 5,821,186, also incorporated herein by reference. Collin's method uses optimum formulations and conditions for making hydrous zirconium oxide gel beads. There formulations or "broths" are an important aspect of making the hydrous zirconium oxide spherical gel bead. By controlling the broth, it is possible to affect the final characteristics of the gel, such as size, shape, porosity, and density.

Therefore, the key parameters of Collin's method include the following: concentrations of the constituents of the broth; broth stability; reaction temperature; gelation time; completeness of gelation; and the structures and chemical composition of gels formed.

The concentrations of the constituents of the broth are an important factor in making microbeads by the internal gelation process. These constituent concentrations influence the broth stability, gelation times, and types of gels. In Collin's method, a broth for making hydrous zirconium oxide for instance, contains four chemical constituents: an organic base, a complexing agent, a zirconium metal salt, and an acid. The initial concentrations of these constituents in the broth and the order of mixing these chemicals are important. Initially, two separate stock solutions are prepared. One contains the organic base and the complexing agent and the other solution contains the zirconium metal salt solution and the acid. Alternatively, the complexing agent can be added to the zirconium metal salt and acid solution rather than with the organic base solution. The complexing agent can be added to either solution provided the final mole ratio of complexing agent to zirconium is greater than or equal to ($\geq$) 1. The preferred practice of the Collin's method is to use a mole ratio of complexing agent to Zr that is similar to the mole ratio of organic base to Zr. To prepare a broth, these solutions are chilled to less than about 10° C., and preferably near 0° C. before they are mixed.

The organic base is used to help form the gel spherules. In an internal gelation method, the broth is introduced into a heated organic medium to form the gel spherules or beads. Introduction of the broth droplets into a flowing stream of hot organic medium causes decomplexation of the zirconium molecules that are complexed with the complexing agent, which then allows the zirconium to be hydrolyzed. While not wanting to be bound by the following statement, it is believed that this hydrolysis reaction is driven by protonation of the organic base molecules, which effectively removes H$^+$ from the broth. Once the organic base molecules are completely protonated, they decompose and remove more hydrogen ions. For example, one hexamethylenetetramine (HMTA) molecule can remove four hydrogen ions from the broth. The rates at which these reactions occur depend upon the temperature of the broth and upon the concentrations of the constituents. For gelation to occur, the pH of the broth droplets should be at or above the pH of precipitation. Precipitation begins in the pH range of 1 to 3 for hydrous zirconium oxide. Therefore, a preferred organic base is one that protonates and decomposes to remove hydrogen ions and hydrolyzes the reaction. The preferred organic base is HMTA.

The complexing agent is used to complex with the zirconium and allows for stable broths at 0° C. As used herein, "stable broth" is meant to include a broth that stays clear and free of metal gelation or precipitation for a reasonable period of time, preferably $\geq$1 hour, before gelation is initiated. As discussed, the organic base is used to hydrolyze the zirconium and cause gel formation at higher temperatures. At higher temperatures, the complexing agent also catalyzes the decomposition of protonated organic base molecules resulting in the organic base molecules being a more effective base. However, decomposition only occurs after most of the organic base molecules have been protonated. To provide more control over the final concentrations of the constituents in the broth, a saturated stock solution of about 3.5 M organic base is prepared which also has a complexing agent concentration of about 3.5 M. The amount of the complexing agent does not have to approximate the amount of the organic base, though this type of broth is preferred as it ensures the proper mole ratios as against the amount of zirconium. The preferred complexing agent is urea.

The first stock solution comprises the organic base and the complexing agent. Additionally, since the final broth preferably has both a ratio of organic base to Zr and a ratio of complexing agent to Zr of $\geq$1, then preferably the first stock solution has a ratio of organic base to complexing agent of about 1:1, although the exact ratio of organic base to complexing agent may vary as desired. The stock solution should be chilled to less than about 10° C. and more preferably to about 0° C., prior to mixing with the second stock solution comprising the zirconium metal salt and the acid. The solution is chilled to avoid premature gelation since the hydrous zirconium oxide will gel as the temperature increases.

The second stock solution used to make the broth of the present invention comprises the zirconium metal salt and the acid. Zirconium metal salts useful in the present invention include any zirconium salt, which is soluble. The zirconium metal salt should provide a sufficient Zr ion concentration in the solution. Examples of these soluble zirconium metal salts include, but are not limited to, zirconyl nitrate, zirconyl chloride and zirconyl tetrachloride.

When water is added to the zirconium metal salt (ZrX), an exothermic reaction occurs with the formation of hydrous zirconium oxide gel and an acid. The types of acids are discussed below. Water acidified with the acid is used to dilute zirconium metal salt to prepare a stable stock solution. When a sufficient amount of acid is added, the hydrolysis reaction is suppressed and gel formation is prevented. As described later, the amount of acid used in a broth is one of the important process parameters for the present invention. The amount of acid used in a broth is a controlling parameter for the gelation process for making hydrous zirconium oxide beads.

In the broth formulations that are described in the present invention, the concentrations of hydrogen ion refer only to the hydrogen ions from the acid that is added to the broth. The acid is added to the broth to help suppress or prevent hydrolysis and gel formation at low temperatures (0° C. to 50° C.). The H$^+$ concentration is important since it helps prevent premature gelation when the complexing agent and organic base are added to the zirconium metal salt solution. A stable broth can be prepared with no addition of acid if the organic base:Zr ratio is 1:1 or less. However, the gelation time for a broth with an organic base:Zr ratio of between about 1 to 1.1 is between about 25 and 30 seconds at 90° C. At lower temperatures, the gelation times are even longer. Any acid may be used, such as hydrochloric acid, nitric acid, sulfuric acid, or phosphoric acid, as long as the acid provides hydrogen ions to help regulate the process. However, in general, the acid selected is dependent upon the zirconium metal salt used, such that the second stock solution comprises a mixture of ZrX and HX, wherein X is F, Cl, Br, I, $NO_3$, $HSO_4$, $H_2PO_4$ or $HCO_3$. Nitric acid and, for non-stainless steel systems, hydrochloric acid are the preferred acids. Therefore, in one embodiment, as shown below in Example 1, the zirconium metal salt is zirconyl nitrate and the acid is nitric acid while in another embodiment, the zirconium metal salt is zirconyl chloride and the acid is hydrochloric acid. However, it is understood that the mixture of ZrX/HX is not a required mixture.

When forming the second stock solutions, as with the first stock solution, the solution should be chilled to less than about 10° C. and more preferably to about 0° C., prior to mixing with the first stock solution. Then, when the two solutions are mixed, the final broth will also be chilled to less than approximately 10° C. This is one of the important factors in making a stable broth. In the present invention, the optimum process parameter window for making microbeads of hydrous zirconium oxide includes a broth that is stable for a reasonable period of time at ice bath temperatures near 0° C. Broth formulations that are stable for $\geq$ about 1 hour are desirable for large-scale preparations. The formulations declared in the optimum process window are therefore stable for $\geq$1 hour. The broth droplets should be introduced in a hot organic medium before gelation is initiated. Broths that gel in less than one hour could be used if the first stock solution of the organic base and complexing agent and the second stock solution of zirconium metal salt and acid were pumped from separate tanks into a mixing device prior to ejection as droplets into the hot organic medium. The apparatus used to make the gel beads of the present invention is the same apparatus used by Collins' in U.S. Pat. No. 6,602,919 and in U.S. Pat. No. 5,821,186, also shown in FIG. 1.

In general, the molarity of the zirconium in the broth should be in the range of about 0.3 to about 1.0 M. However, the preferred molarity of zirconium in the broth is in the range of about 0.4 M to about 0.8 M. An organic base:$H^+$ mole ratio of $\geq 0.9$ is needed for gelation to occur for a specified gelation time of $\leq 60$ seconds. However, lower ratios may be used if a gelation time of greater than 60 seconds is desired. In these situations, the gels formed with are larger in size due to coalescence.

The amount of the organic base and the complexing agent in the broth will be approximately the same for the reasons previously discussed. These amounts will vary depending on the temperature at which the gel is formed. Higher temperatures permit the use of lower amounts of organic base and complexing agent, and lower temperatures permit the use of higher amounts of organic base and complexing agent. In the present invention, the temperatures at which the gels may be formed range from ambient temperature to about 100° C. These temperature conditions require the concentration of the organic base and the complexing agent to range from about 0.5 M to about 3.5 M. A concentration of about 3.5 M is considered to be the saturation concentration for each of the organic base and the complexing agent. However, in determining the concentration of the organic base and the complexing agent, it is important to remember that the organic base:Zr ratio and the complexing agent:Zr ratio should both be $\geq 1:1$.

The concentration of acid used can range from about 0 M to about 1.2 M. As previously discussed, an acid is not necessary for the formation of the hydrous zirconium oxide gels, but the acid prevents premature gelation when the broth is formed. The acid also permits quicker gelation times by allowing higher organic base:Zr ratios to be employed.

FIG. 1 and FIG. 1a illustrate one embodiment of an apparatus that is suitable for carrying out the gelation step of the present invention. In this embodiment, the chilled broth is injected through a needle 3 into a column 11 of silicone oil that is continuously recirculating from a heated reservoir 7. The broth droplets gel during their residence time in a downstream transport line 13 and are collected in a basket 15 for washing.

FIG. 1 illustrates a chilled broth is first formed and then added to the chilled apparatus broth pot 1 and processed through the gel-forming or spherule-forming apparatus. The system also includes a needle 3 that is used in a two-fluid nozzle 5 for placing broth droplets in the hot organic medium where they gel. The apparatus also includes a reservoir 7 for heating the organic medium, a pump 9 for circulating the organic medium, a chilled broth pot 1, a two-fluid nozzle system 5 for controlling the size of the broth droplets, a glass gelation column (forming column) 11, a downstream transport line 13 to provide a residence time for the gel spherules to hydrolyze and solidify, and a product collector 15 for collecting and aging the gelled spherules and also for separating the organic medium from the gelled spherules.

The organic medium reservoir 7 may comprise a stainless steel open-top rectangular container. One or more heating blades 17 may be positioned at the rear of the reservoir to heat the organic medium. A thermocouple 19 may be positioned in the basket at the bottom and near the front of the reservoir and is connected to a temperature controller 21 that is used to control the organic medium temperature. A stirrer 23 with its shaft positioned away from the heating blade or blades 17 (other blades not shown) and its impeller located near the bottom of the reservoir is used to mix and maintain the organic medium at a desired temperature. Occupying most of the front space in the reservoir 7 is a large removable basket 15 that serves as a backup to prevent any spilled gelled spherules from being pumped out of the reservoir to the circulating pump.

The pump 9 is used to pump the hot organic medium from the reservoir 7 through a line to the vertically positioned glass gelation column 11. The flow from the pump 9 is divided into two streams that are controlled by manual valves. The flow of one of the streams may be routed to a position above the center of the top of the gelation column 11. Vertically attached to this line may be a tube whose outlet end is inserted into the entrance of the gelation column. The tube is part of the two-fluid nozzle 5 system that is used to control the size of the droplets. The other hot organic medium stream from the pump 9 is routed to a fitting at the bottom of the gelation column 11 and flows up through a shell 25 that surrounds the gelation column 11. The hot organic medium over-flows at the top of the column, first, into the gelation column 11 and, then, into an overflow cup 27. A large tube 29 is connected to a fitting from the overflow cup 27 to route any overflow back to the hot organic medium reservoir 7. During operation, the flow of organic medium from the heating shell 25 is normally adjusted to provide only a slight overflow.

As shown in FIG. 1a, the two-fluid nozzle system 5 is very simple. It comprises a needle 3 that is perpendicularly inserted through the wall of the tube to the midpoint of the hot organic medium carrier stream and is positioned approximately 5 inches above the entrance to the gelation column 11. The chilled broth is jetted into the laminar flowing oil by air pressurizing the broth pot 1, forcing the broth out a tube at the bottom of the broth pot through a short plastic line that is connected to the needle 3. The size of the droplets formed is dependent upon the gauge of the needle used and the flow rates of the hot organic medium and of the broth.

The hot organic medium carrying the droplets from the two-fluid nozzle tube 5 flows directly into the central concurrent flow tube of the jacketed gelation column 11 where it is desirable for the droplets to begin to gel. On exiting the gelation column 11, the gelling spheres flow into a serpentine transport line 13. This line is long enough (about 8-ft.) to allow the gelling spherules to have a total residence time of 25 to 35 seconds to the collection basket 15. The transport time also includes the time the spherules are passing through the gelation column. The gelation column and serpentine transport system are designed to be a siphoning system with a gravity head of about 60-cm for oil temperatures in the range of about 45° to The collection basket 15 is positioned above the hot organic medium reservoir 7, and is used to collect and separate the gel spherules from the hot organic medium as they exit the serpentine transport line 13. The collected gel spherules are aged by lowering the collection basket 15 into the reservoir 7 for between 15 and 30 minutes, preferably 20 minutes. After aging, the bulk of the organic medium is drained from the gel spherules and the residual organic medium is removed by a series of washing steps to remove the reaction impurities.

Another basket of similar design may also be positioned above the hot oil reservoir to filter the return organic medium from a tube, which is connected to the overflow drain line at the top of the gelation column.

The organic medium may be a one-component solvent or a binary mixture; for example, silicone oils such as Silicon Fluid 200 (Dow Corning, Midland, Mich.) for temperature ranging from ambient temperatures to 100° C.

The following examples illustrate the invention in more detail.

EXAMPLE 1

Hydrous zirconium oxide (HZrO) gel beads were made by internal gelation using the technique and apparatus, described above and as shown in FIG. 1 and FIG. 1a, also described by Collins. A feed broth containing 100 ml zirconyl nitrate, 14.5 ml nitric acid, and 70 ml hexamethylenetetramine (HMTA) was injected into warm silicone oil, as described in U.S. Pat. No. 5,821,186, to form spherical gel beads. The beads were dried in air to form small glassy beads, which were then soaked in a solution of 1% Eu nitrate, dried again, and fired in air at 1° C./min to 1000° C. The fired beads were opaque off-white color. Under UV illumination, the beads displayed a weak red fluorescence.

Skilled artisans will appreciate that hydrous oxides of other Group IV metals, e.g., Ti may be made by a similar approach (see, for example, Collins, U.S. Pat. No. 5,821,186, the teachings of which are incorporated herein by reference). Furthermore, it is well known that rare earth phosphates are another excellent host material for phosphors and these compounds are also quite stable against environmental degradation. Phosphates may be conveniently made by a modification of the inventive process as shown in the following example, wherein wet hydrous zirconium oxide gel beads formed as described above, then rinsed with an amount of phosphoric acid having a concentration $\leq 0.5$ M for a period of time sufficient to allow the beads to be converted to acid insoluble zirconium monohydrogen phosphate. Next, the beads are mixed with concentrations of phosphoric acid $\geq 0.5$ M and placed in a sealed pressure vessel. Then, the beads are covered with an amount of phosphoric acid sufficient to complete the conversion of the spherules to acid insoluble zirconium monohydrogen phosphate and to prevent the hydrous zirconium oxide from dissolving before the conversion. Finally, the beads are heated in the phosphoric acid to a predetermined temperature up to 100° C. The temperature may be increased from ambient temperature up to 100° C. over time to produce the desired crystallinity. After the desired crystallinity has been formed, the spherules may then be cooled and rinsed to remove unreacted phosphoric acid, and then air dried to a constant temperature.

EXAMPLE 2

Wet hydrous zirconium oxide (HZrO) gel beads, made by the method described above, were washed several times in 0.5 M phosphoric acid, allowed to stand about four hours in this solution, then washed several times in 1.0 M phosphoric acid. Hydrothermal conversion was done at 125° C. in 1.0 M phosphoric acid in a closed stainless steel vessel. The conversion step was then repeated several more times, each time increasing the phosphoric acid concentration by 0.5 M until the final treatment was done in 2.5 M phosphoric acid. This material had been dried to form glassy beads. When these dried beads were placed in a 1% Eu nitrate solution, they fractured into concentric shards during rehydration, but absorbed the solution adequately. These fragments were dried and fired in air as in the previous example. Under UV illumination, the particles were very strongly fluorescent (bright red).

EXAMPLE 3

An attempt was made to avoid the cracking problem encountered when dried HZrP beads were rehydrated. Using the materials and procedures of the previous example, hydrous zirconia beads were reacted with phosphoric acid and washed. While still wet, the HZrP gel beads were placed overnight in a 1% Eu nitrate solution, then dried for several days and fired in air at 1° C./min to 1000° C. A similar batch was placed overnight in a 1% Ce nitrate solution, dried, and fired in air at 1° C. 1 min to 1000° C.

EXAMPLE 4

These batches were designed to make doped HZrO beads directly by coprecipitation. Using the technique described above, zirconium-containing broths were made up using 1 M zirconyl nitrate to which either 1% Eu, Er, or Ce (metals basis) was added as the nitrate. 100 ml of Zr solution, 0.4 g of rare earth nitrate, 14.5 ml of nitric acid, and 70 ml of HMTA/urea stock solution were mixed to form a chilled broth. These broths were injected into hot silicone oil at about 82–86° C. following standard techniques as previously described. The wet beads were aged in the hot oil for about 20 min and then washed in trichloroethylene (TCE) and stored in deionized water.

EXAMPLE 5

Wet beads of HZrO:Eu and HZrO:Ce made in the previous example were converted to HZrP by soaking overnight in 0.1 M phosphoric acid, followed by an additional soak for about 4 hours in 1.5 M phosphoric acid. (conversion can also be done in a hydrothermal "Parr reactor" if desired, as discussed in Example 2). The converted beads were washed in deionized water, dried, and fired as in Example 3.

The foregoing examples describe one variant of sol-gel processing normally referred to as internal gelation. It is a fast and easily controlled method for making mono-sized ceramic gel beads, particularly when the composition is substantially a single oxide such as $ZrO_2$. When multiple oxides are involved, it is sometimes found that one cannot conveniently establish conditions under which both metal salts will be stable and then induce conditions where both oxides will precipitate simultaneously. For this situation, other sol-gel methods such as external gelation or water extraction may be employed. All three of the aforementioned sol-gel methods share the common characteristic that the gelation step occurs in a mixture of two immiscible fluids whose surface tension is exploited to create essentially spherical droplets that retain their sphericity upon gelation, drying, and sintering. U.S. Pat. No. 5,420,086 by Brandau et al. describes external gelation processes and chemistries, the teachings of which are incorporated herein by reference. The water extraction method is taught in Arnold et al., U.S. Pat. No. 5,062,993, the entirety of which is incorporated herein by reference.

EXAMPLE 6

Because of differences in the chemical properties of aluminum and yttrium, it would be easier to make YAG by water extraction, rather than by an internal gelation method. Following the teachings of Arnold U.S. Pat. No. 5,062,993, hydrous alumina and hydrous yttria sols are mixed in the correct stoichiometric amounts (5:3) to yield the target composition of $Y_3Al_5O_{12}$ and droplets of this mixed sol are injected into a forming liquid such as 2-ethylhexanol. The forming liquid extracts water from the droplets, causing them to shrink and to form rigid gel beads. These beads may be sintered in air to a desired level of density and translucency by conventional methods.

EXAMPLE 7

Using the method outlined in the previous example, the YAG beads are conveniently doped by either of two means. First, small amounts of dopant oxides are included in the starting hydrous oxide sols. Alternatively, the dopant is introduced as a soluble salt in a second infiltration step as discussed in several of the previous examples.

It will be clear that ceramic microbeads made according to any of the foregoing examples are readily distinguished from other natural or artificial oxide particles of comparable size. For example, fly ash from coal combustion may include spherical particles that lie within the claimed size range. However, fly ash is substantially silica glass with large amounts of alkali, alkaline earths, and frequently iron. It is not fluorescent and does not contain significant amounts of rare earths. Fly ash and slag from smelting operations are distinguished by its composition, namely, high levels of transition metals and characteristic nonmetals such as arsenic. Naturally occurring mineral grains do not have the same composition as the inventive particles and are angular, acicular, or plate-like in this size range, rather than spherical.

The ceramic microbeads of the present invention should be sintered to an appropriate density to give them adequate strength and translucency for a particular application. At the same time, it will be appreciated that a small amount of residual porosity in an otherwise substantially dense bead will not normally impair its functionality for the applications described herein. In general, the inventive beads are preferably greater than about 90% of theoretical density and more preferably greater than about 95% of theoretical density.

Translucency, as used herein, is a relative term. Some beads might appear opaque (white or off-white) to the naked eye, yet retain enough translucency to allow for sufficient intensity of the characteristic optical emissions. Skilled artisans will appreciate that the degree of translucency or transparency are related to sintering parameters (time and temperature) in a well-understood way, so that the translucency to meet a specific requirement without undue experimentation can be controlled. In some cases, if the beads are substantially transparent, they could be made in a particular diameter to form a resonant optical cavity at a selected wavelength. In this situation, the beads in a particular batch would preferably be mono-sized and optionally polished by conventional bead polishing methods such as those used for ball bearings.

At the point of end use, a batch might be all the same composition or might include a range of compositions, sizes, and dopants in order to exhibit a distinctive "fingerprint". This is especially useful for coatings, in which a particular blend of microbeads is viewed as a whole rather than as individually recovered beads or bead fragments.

Various mixed oxides could be used in addition to the compositions enumerated above. In particular, it has been previously demonstrated that rare earth aluminum garnets, of the general composition $R_3Al_5O_{12}$ where R=Dy, Ho, Y, Er, Tm, Yb, or Lu, can serve as the host matrix for many other dopants (especially other rare earths) and, thereby, provide great latitude for spectral manipulation as described by Lowden et al. in U.S. patent application Ser. No. 09/935,865 filed Aug. 23, 2001, U.S. Publication No. US-2003-0078156-A1, published Apr. 24, 2003, the teachings of which are incorporated herein by reference.

Those skilled in the art can imagine other application scenarios in which it is desirable to tag a person, vehicle, or other article or to determine if a person has passed through a tagged area. For this application, a durable material is needed that is easily dispersed and picked up on tires, shoes, clothing, or the like, yet, is relatively invisible or innocuous to the casual observer. Here, materials at the smaller end of the size range are contemplated (such as 10 $\mu$m). These would look like white powder or dust and yet would be reasonably robust, perhaps becoming implanted in shoes, tires, etc. and surviving for some period of time. The beads could also be surreptitiously incorporated into fabric for similar purposes.

It is further understood that the inventive beads may or may not contain a separate "spotting phosphor" in addition to the "coding" phosphor. For explosive tagging, the spotting phosphor is intended to ease location and recovery of forensic evidence and is therefore generally desirable. On the other hand, for clandestine tagging it might be desirable to avoid unwanted detection by either eliminating the spotting phosphor species entirely or using a spotting phosphor that does not fluoresce in the visible range.

Furthermore, the inventive beads can also be incorporated into paints or coatings if desired, in order to impart distinctive optical emission characteristics to a selected object. Applications where such coatings might find use include camouflage, target designation, identify friend or foe, and material tracking or logistics.

It is understood that a batch of nominally spherical particles includes some number of particles that have fractured or split, and furthermore that additional fragmentation of the particles might occur during detonation of the explosive material or through various environmental forces. Nevertheless, even broken spheres normally retain some fraction of their original surface, from which a characteristic diameter or radius of curvature may be ascertained (through microscopic examination, for example).

While several preferred embodiments have been shown and described, and several examples have been specifically delineated, it will be understood that such descriptions are not intended to limit the disclosure, but rather it is intended to cover all modifications and alternate methods falling within the spirit and scope of the invention as defined in the appended claims or their equivalents.

We claim:

1. An aptical taggant material comprising sintered translucent ceramic beads wherein said beads comprise an oxide of an element selected from the group consisting of Al, Ti, Zr, Hf, Dy, Ho, Y, Er, Tm, Yb, and Lu with at least one optically active species in solid solution whereby said beads have a distinctive optical spectrum and said beads have a substantially spherical surface with a characteristic dimaeter greater than about 10 $\mu$m and less than about 2 mm whereby said characteristic diameter provides a further distinguishing feature.

2. The material of claim 1 wherein said ceramic beads comprise a rare earth aluminum garnet of the general composition $R_3Al_5O_{12}$ wherein R is at least one element selected from the group consisting of Dy, Ho, Y, Er, Tm, Yb and Lu.

3. The material of claim 1 wherein said ceramic beads are derived from a sol-gel process.

4. The material of claim 3 wherein said optically active species is incorporated into said beads by coprecipitation during said sol-gel process.

5. The material of claim 3 wherein said optically active species is incorporated into said beads by infiltration of the gel after gelation has been completed in said sol-gel process and prior to sintering said beads.

6. The material of claim 1 wherein said ceramic beads comprise a rare earth phosphate, said phosphate derived from a sol-gel process by conversion of a hydrous rare earth oxide gel in phsophoric acid.

7. The material of claim 6 wherein said optically active species is incorporated into said beads by coprecipitation with said rare earth oxide during said sol-gel process.

8. The material of claim 6 wherein said optically active species is incorporated into said beads by infiltration after the hydrous oxide has been converted to said phosphate and prior to sintering said beads.

9. A method for making an optical taggant comprising the steps of:
   a. selecting a metal oxide host material, said metal oxide being substantially transparent in its pure form;
   b. forming a generally spherical hydrous bead of said metal oxide by a sol-gel process;
   c. incorporating a dopant within said bead, said dopant comprising at least one optically active metal ion;
   d. drying said doped bead; and,
   e. sintering said doped bead to form a substantially dense, translucent solid solution having an identifiable optical spectrum owing to the presence of said dopant and an identifiable surface curvature owing to said spherical shape.

10. The method of claim 9 wherein said metal oxide is an oxide of an element selected from the group consisting of Al, Ti, Zr, Hf, Dy, Ho, Y, Er, Tm, Yb, and Lu.

11. The method of claim 9 wherein said bead comprises a rare earth aluminum garnet of the general composition $R_3Al_5O_{12}$ wherein R is at least one element selected from the group consisting of Dy, Ho, Y, Er, Tm, Yb, and Lu.

12. The method of claim 9 wherein said optically active metal ion is incorporated into said bead by coprecipitation during said sol-gel process.

13. The method of claim 9 wherein said optically active metal ion is incorporated into said bead by infiltration of the hydrous oxide gel bead after gelation has been completed in said sol-gel process and prior to sintering said bead.

14. The method of claim 9 further comprising a conversion step immediately after step b, wherein said hydrous metal oxide bead is converted from a hydrous oxide to a hydrous phosphate by reaction with phosphoric acid.

* * * * *